(12) United States Patent
Wu (10) Patent No.: US 6,389,062 B1
(45) Date of Patent: May 14, 2002

(54) ADAPTIVE FREQUENCY DOMAIN EQUALIZER CIRCUITS, SYSTEMS, AND METHODS FOR DISCRETE MULTITONE BASED DIGITAL SUBSCRIBER LINE MODEM

(75) Inventor: Song Wu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/069,919

(22) Filed: Apr. 30, 1998

Related U.S. Application Data
(60) Provisional application No. 60/059,124, filed on Sep. 17, 1997.

(51) Int. Cl.[7] .................................................. H04B 1/38
(52) U.S. Cl. ........................................ 375/222; 375/229
(58) Field of Search ................................. 375/222, 231, 375/229, 233, 260; 370/484, 220

(56) References Cited

U.S. PATENT DOCUMENTS

| | | | | |
|---|---|---|---|---|
| 5,285,474 A | * | 2/1994 | Chow et al. ................. | 375/222 |
| 5,400,322 A | * | 3/1995 | Hunt et al. .................. | 370/468 |
| 5,901,180 A | * | 5/1999 | Aslanis et al. ............... | 375/261 |
| 6,009,122 A | * | 12/1999 | Chow .......................... | 375/260 |
| 6,028,891 A | * | 2/2000 | Ribner et al. ................ | 375/222 |
| 6,081,502 A | * | 6/2000 | Paneth et al. ............... | 370/210 |

OTHER PUBLICATIONS

"A Discrete Multitone Transceiver System for HDSL Applications," Chow et al., IEEE Journal on Selected Areas in Communications, vol. 9, No. 6, 08/91, pp. 895–908.

"Multicarrier Modulation for Data Transmission: An Idea Whose Time Has Come," John A.C. Bingham, IEEE Communications Magazine, 05/90, pp. 5–8 and 11–14.

Cioffi, "A Multicarrier Primer," Cioffi, John M., Tutorial submitted to Standards Committee T1 of IEEE, 1991, pp. 1–18.

\* cited by examiner

*Primary Examiner*—Chi Pham
*Assistant Examiner*—Khai Tran
(74) *Attorney, Agent, or Firm*—J. Dennis Moore; W. James Brady, III; Frederick J. Telecky, Jr.

(57) ABSTRACT

A method of modem communications between first and second modems (10, 20k) over a communications facility (TWP). The method operates the first modem ($20_k$) to issue communications to the second modem (10) over the communications facility. These communications comprise a plurality of subchannel signals (n). The method also operates the second modem to perform various steps. In one of these steps, the second modem converts (33) the communications from time domain communications to frequency domain communications, where the frequency domain communications signals comprise a plurality of subchannel signals. Each of these plurality of subchannel signals comprises an amplitude portion and a phase portion. In another of these steps, the second modem equalizes (36) the amplitude portion of each of the plurality of subchannel signals using fixed gain factors (GE(n))corresponding to each of the plurality of subchannel signals. In still another of these steps, the second modem equalizes (37) the phase portion of each of the plurality of subchannel signals using adjustable phase factors (PE(n)) corresponding to each of the plurality of subchannel signals. The adjustable phase factors are adjusted in response to previous communications from the first modem to the second modem.

24 Claims, 5 Drawing Sheets

ADAPTIVE FREQUENCY DOMAIN EQUALIZER CIRCUITS, SYSTEMS, AND METHODS FOR DISCRETE MULTITONE BASED DIGITAL SUBSCRIBER LINE MODEM

CROSS-REFERENCES TO RELATED APPLICATIONS

This application claims the benefit, under 35 U.S.C. §119(e)(1), of U.S. Provisional Application No. 60/059,124, filed Sep. 17, 1997, entitled "Adaptive Full Dynamic Range Frequency Domain Equalizer For DMT Based xDSL Modem," and incorporated herein by this reference.

STATEMENT REGARDING FEDERALLY SPONSORED RESEARCH OR DEVELOPMENT

Not Applicable.

BACKGROUND OF THE INVENTION

The present embodiments relate to high-speed modem telecommunications, and are more particularly directed to adaptive frequency domain equalizer circuits, systems, and methods for discrete multitone based digital subscriber line modem.

The high-speed exchange of digital information between remotely located computers is now a pervasive part of modern computing in many contexts, including business, educational, and personal computer uses. It is contemplated that current and future applications of high speed data communications will continue the demand for systems and services in this field. For example, Video on demand ("VOD") is one area which has for some time driven the advancement of technology in the area of digital information exchanges. More recently, the rapid increase in use and popularity of the Global Internet (hereinafter, the "Internet") has further motivated research and preliminary development of systems directed to advanced communication of information between remotely located computers, particularly in accomplishing higher bit rates using existing infrastructure.

One type of technology arising from the above and continuing to evolve is referred to in the art as digital subscriber line ("DSL"). DSL refers generically to a public network technology that delivers relatively high bandwidth over conventional telephone company copper wiring at limited distances. DSL has been further separated into several different categories of technologies, according to a particular expected data transfer rate, the type and length of medium over which data are communicated, and schemes for encoding and decoding the communicated data.

In each case, a DSL system may be considered as a pair of communicating modems, one of which is located at a customer site, such as a home or office computer, and the other of which is located at a network controller site, typically a telephone company central office. Within the telephone company system, this modem is connected to communicate with some type of network, often referred to as a backbone network, which is in communication with other communication paths by way of equipment such as routers or digital subscriber line access multiplexers ("DSLAMs"). Through these devices, the backbone network may further communicate with dedicated information sources and with the Internet As a result, information accessible to the backbone network, such as Internet information, may be communicated between the central office DSL modem and a customer site having its own compatible DSL modem.

Within this general system it is also anticipated that data rates between DSL modems may be far greater than current voice modem rates. Indeed, current DSL systems being tested or projected range in rates on the order of 500 Kbps to 18 Mbps or higher. According to certain conventional techniques, the data communication rates are asymmetrical. Typically, the higher rate is provided for so-called downstream communications, that is from the central office to the customer site, with upstream communication from the customer site to the central office at a rate considerably lower than the downstream rate. Most DSL technologies also do not use the whole bandwidth of the twisted pair, reserving a relatively low bandwidth channel for voice communication, so that voice and data communications may be simultaneously carried out over the same line.

The most publicized DSL technology currently under development is referred to as Asymmetric Digital Subscriber Line, or "ADSL," and corresponds to ANSI standard T1.413. Despite the existence of this standard, debate and competition is still present in the art, particularly as to whether devices complying with the standard provide promise for future wide scale use and whether the standard requires revision. For example, while the standard currently contemplates a modulation technology called Discrete Multitone ("DMT") for the transmission of high speed data, an alternative data transmission technique referred to as carrierless amplitude/phase modulation ("CAP") has also recently gained favor in the field. In any event, given the current state of the art, it is contemplated that ADSL systems will communicate data over a single copper twisted pair at downstream rates on the order of 1.5 Mbps to 9 Mbps, and with an upstream bandwidth will range from 16 kbps to 640 kbps. Along with Internet access, telephone companies are contemplating delivering remote local area network ("LAN") access and VOD services via ADSL.

Other DSL technologies being developed include High-Bit-Rate Digital Subscriber Line ("HDSL"), Single-Line Digital Subscriber Line ("SDSL"), and Very-high-data-rate Digital Subscriber Line ("VDSL"). HDSL, unlike ADSL as described above, has a symmetric data transfer rate, that is, it communicates at the same speed in both upstream and downstream directions. Current perceived speeds are on the order of 1.544 Mbps of bandwidth, but require two copper twisted pairs. However, the operating range of HDSL is more limited than that of ADSL, and is currently considered to be effective at distances of approximately 12,000 feet or less, beyond which signal repeaters are required. SDSL delivers comparable symmetric data transfer speed as HDSL, but achieves these results with a single copper twisted pair which limits the range of an SDSL system to approximately 10,000 feet. Lastly, VDSL provides asymmetric data transfer rates at much higher speeds, such as on the order of 13 Mbps to 52 Mbps downstream, and 1.5 Mbps to 2.3 Mbps upstream, but only over a maximum range of 1,000 to 4,500 feet.

Of course, in addition to performance considerations and to the distance over which DSL communications may be carried by conventional twisted-pair infrastructure, the cost of the modem hardware is also a significant factor in the selection of a communications technology. It is therefore contemplated that a lower data rate technology may provide high-speed data communications, with downstream data rates exceeding 1 Mbps, over existing twisted-pair networks and at cost that is competitive with conventional non-DSL modems, such as 56 k, V.34, and ISDN modems.

By way of further background, in one aspect of DSL modems implementing DMT modulation, it is required that a modem receiving a signal correct or equalize the received signal given variations which are imposed on the signal due to various factors such as the transmission medium as well as the extensive circuitry and processing which is imposed on the signal as it is received and is deciphered by the receiving modem. In this regard, a typical modem equalizes the signal using a time domain equalizer separate from a frequency domain equalizer. The time domain equalizer shortens the channel impulse response to reduce the intersymbol interference. The frequency domain equalizer provides a correction function which equalizes the channel amplitude and phase distortions at each sub-carrier frequency. As detailed later in connection with the preferred embodiment, however, one drawback in a non-ideal approach may sacrifice information at one end of the frequency spectrum (e.g., lower frequency sub-carriers) in favor of information at the other end (e.g., higher frequency sub-carriers). Therefore, a need arises to address this drawback as well as the considerations discussed above.

BRIEF SUMMARY OF THE INVENTION

In one embodiment, there is a method of modem communications between first and second modems over a communications facility. The method operates the first modem to issue communications to the second modem over the communications facility. These communications comprise a plurality of subchannel signals. The method also operates the second modem to perform various steps. In one of these steps, the second modem converts the communications from time domain communications to frequency domain communications, where the frequency domain communications signals comprise a plurality of subchannel signals. Each of these plurality of subchannel signals comprises an amplitude portion and a phase portion. In another of these steps, the second modem equalizes the amplitude portion of each of the plurality of subchannel signals using fixed gain factors corresponding to each of the plurality of subchannel signals. In still another of these steps, the second modem equalizes the phase portion of each of the plurality of subchannel signals using adjustable phase factors corresponding to each of the plurality of subchannel signals. The adjustable phase factors are adjusted in response to previous communications from the first modem to the second modem. Other circuits, systems, and methods are also disclosed and claimed.

DETAILED DESCRIPTION OF THE INVENTION

Figure 1:
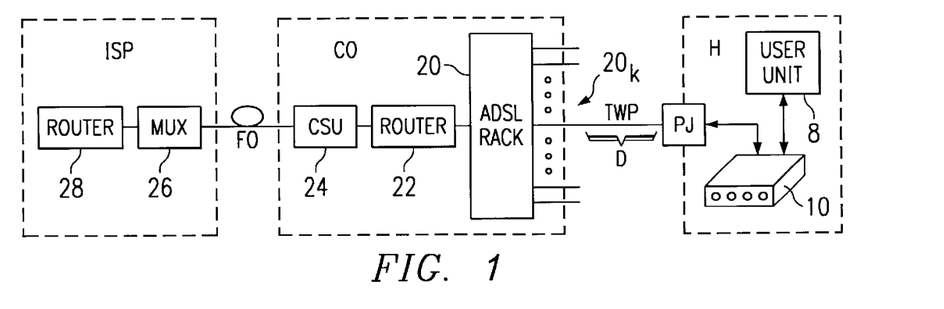
FIG. 1 is an electrical diagram, in block form, of a digital subscriber line communication system into which the preferred embodiment of the invention may be implemented.

Referring first to FIG. 1, a telecommunication system into which the preferred embodiment of the present invention may be implemented is now described in detail. According to this system, a user in a home or office environment (shown as user environment H) operates user unit 8, such as a personal computer or workstation, or which alternatively may be an entertainment unit in the video-on-demand ("VOD") context. User unit 8 is connected to remote modem 10, the construction and operation of which is described in detail below, which is connected to twisted-pair wire facility TWP by way of a conventional phone jack PJ. One or more telephones (not shown) also may be connected into twisted pair wire facility TWP by way of phone jack PJ, such that voice communications may alternatively or additionally be communicated over twisted pair wire facility TWP.

Twisted pair wire facility TWP is implemented by way of conventional telephone wiring between a home or office user environment H and central office CO. As is fundamental in the communications field, central office CO is a location that is operated by a telephone carrier or service provider, and which provides switching of telephone calls, both incoming and outgoing, relative to the user environments H that it services. Central office CO is typically provided relatively close to its associated user environments H; in this example, for purposes of achieving high-speed data communications according to the ADSL or MDSL protocols to be described herein, distance d between central office CO and user environment H is preferably no greater than 18,000 feet, due to the attenuation of high speed communications over conventional twisted pair wire facility TWP. Alternatively, if user environment H is more than this specified distance from central office CO, one or more signal repeaters (not shown) may be included within twisted pair wire facility TWP to boost the signals along their respective paths, particularly from central office CO to user environment H.

According to this embodiment of the invention, central office CO includes a DSL modem rack 20, which includes multiple ones of central office modems 20, one of which is in communication (either directly, or through a switch) with twisted pair wire facility TWP associated with user environment H. The construction and operation of each of modems $20_k$ are described in further detail below. DSL modem rack 20 is connected to a conventional router 22, and in turn via channel service unit ("CSU") 24 to Internet service provider ISP via fiber optic line FO. Internet service provider ISP may be at a separate location, operated separately from central office CO or, if the telephone service provider that operates central office CO also provides Internet access, Internet service provider ISP may simply be a separate function within central office CO or elsewhere in its network. As illustrated in FIG. 1, Internet service provider ISP generally includes multiplexer 26 to service multiple central offices CO, and router 28 by way of which user units 8 may be placed in connection with other Internet servers for communication of information.

Figure 2:
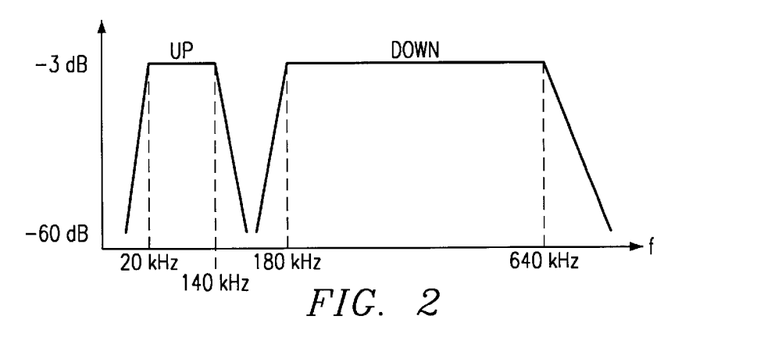
FIG. 2 is a plot of frequency versus signal amplitude, illustrating the frequency division multiplexing according to which the system of FIG. 1 operates according to the preferred embodiment of the present invention.

According to the preferred embodiment of the present invention, high-speed data communication from central office CO to home environment H over twisted pair wire facility TWP of limited length d is preferably accomplished by way of frequency division multiplexing ("FDM"). In this example, which is now described relative to FIG. 2, so-called downstream communication from central office CO to home environment H is performed at high frequency, within bandwidth DOWN illustrated in FIG. 2. For example, as shown in FIG. 2, downstream bandwidth DOWN ranges from approximately 180 kHz to approximately 640 kHz. In contrast to the downstream transmission, upstream communication from home environment H to central office CO over twisted pair wire facility TWP is performed at lower frequency, within a lower frequency bandwidth UP (FIG. 2) which, in this example, ranges from approximately 20 kHz to approximately 140 kHz. The actual bandwidths illustrated in FIG. 2 are consistent with the so-called Medium Data Subscriber Line ("MDSU") technology utilized in the preferred embodiment of the invention described herein; by way of reference, full ADSL communication occupies approximately twice the bandwidth illustrated in FIG. 2.

This frequency division between upstream and downstream communications is selected considering that most home and office users will more frequently download larger blocks of information from the Internet via central office CO, relative to the amount of information (typically email) that these users will upload to the Internet Recognition of these different uses and traffic requirements for upstream and downstream communication permits the division of the overall bandwidth in the manner illustrated in FIG. 2. As a result, modems 10, $20_k$ may readily communicate with one another, with such noise effects as echoes being readily filterable by simple bandpass filtering, given the wide disparity between upstream and downstream frequencies. For example, an upstream echo of downstream data will be at the higher, downstream, frequency when received at central office 20, thus permitting this echo to be easily filtered from the lower frequency signal. Additionally, the frequency division multiplexing illustrated in FIG. 2 also facilitates the filtering of near-end crosstalk ("NEXT"), in much the same manner as echo cancellation.

Figure 3:
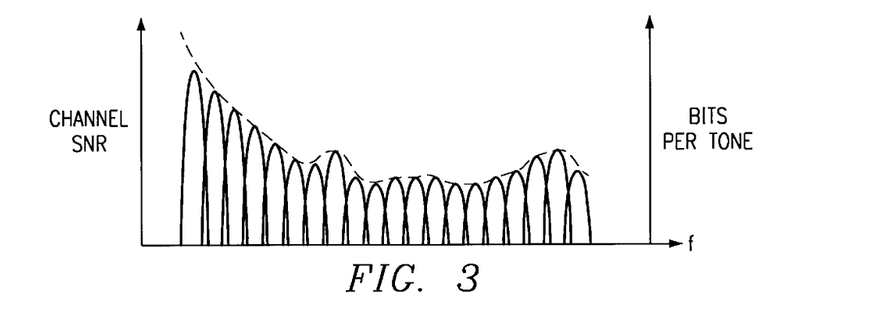
FIG. 3 is a plot of frequency versus signal-to-noise ratio, and potential bit loading, for each of multiple subchannels within the downstream transmission bandwidth in the plot of FIG. 2.

According to the preferred embodiment of the invention, the frequency division multiplexed communication is carried out by way of discrete multi-tone modulation ("DMT"), in which the bandwidth is uniformly divided into multiple bins, or subchannels, each having a relatively narrow bandwidth, for example 5 kHz. FIG. 3 illustrates an example of this division, for a portion of the downstream frequency bandwidth DOWN of FIG. 2 In the system of FIG. 1, the transmission characteristics of twisted pair wire facility TWP, as terminated at remote modem 10 and central office modem $20_k$, varies with frequency, such that each subchannel may have a different signal-to-noise ratio as illustrated in FIG. 3. According to the preferred embodiment of the present invention, the various subchannels are "loaded" to carry data at a wordwidth that depends upon their signal-to-noise ratio. In other words, subchannels having a higher signal-to-noise ratio are capable of carrying more bits than are subchannels with a poorer signal-to-noise ratio; as such, FIG. 3 illustrates that the number of "bits per tone" corresponds to the signal-to-noise ratio of the subchannels.

It is contemplated that the attenuation behavior of the system over frequency cannot generally be determined without experiment or actual data, as this behavior is highly determined by characteristics of each individual installation, and thus does not necessarily follow a simple-order model. As such, upon establishing a connection, the transmitting portions of remote modem 10 and central office $20_k$ are set during the initialization procedure according to the preferred embodiment of the invention, as will be described in detail below. This initialization procedure includes one modem sending a probe signal to determine the signal-to-noise ratio ("SNR") of each frequency bin, and the receiving modem returning a signal, back to the transmitting modem, indicating the measurement result and the bit rate loading for each subchannel.

Figure 4:
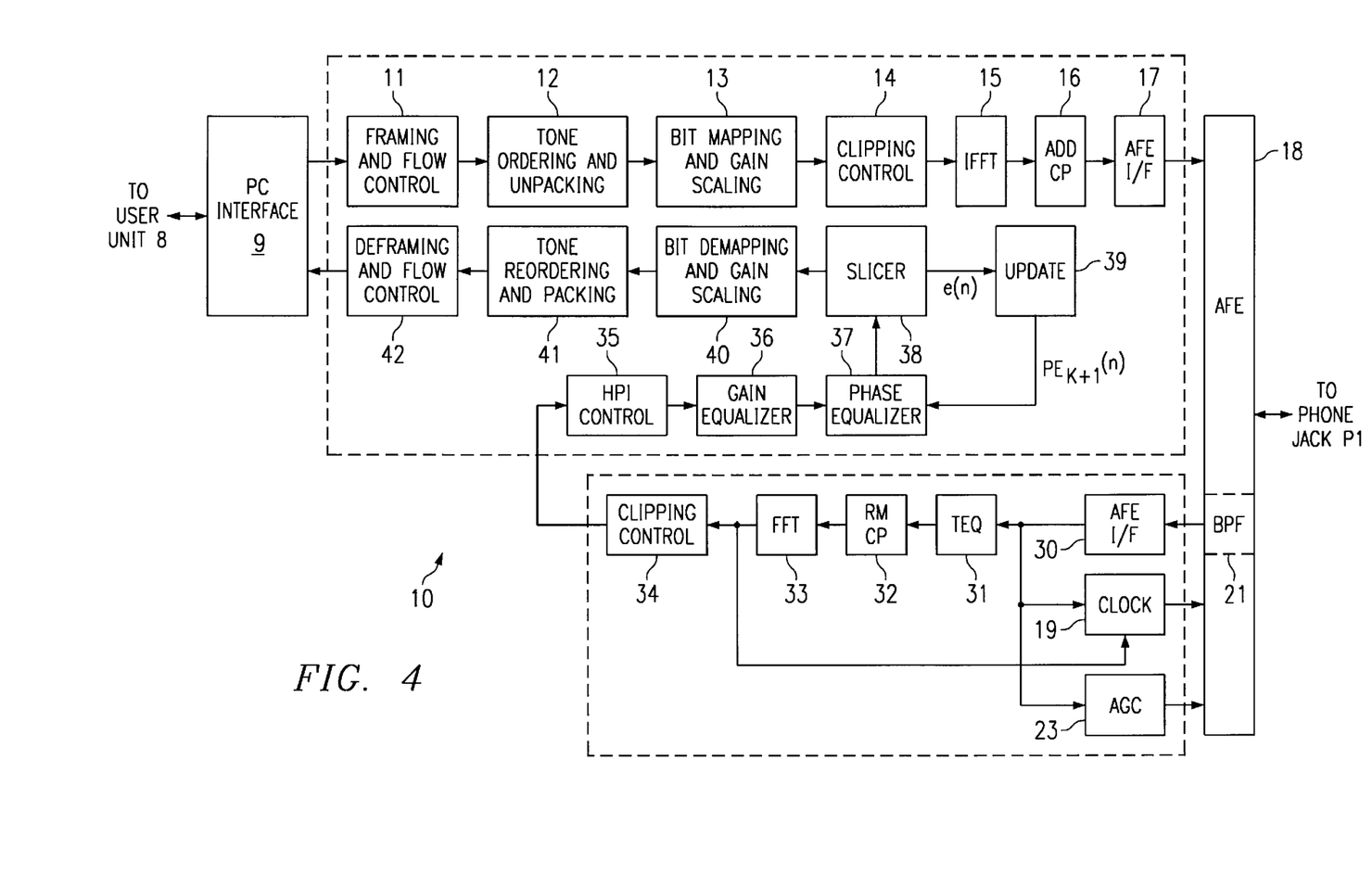
FIG. 4 is a block flow diagram illustrating the operating functions of the remote modem in the system of FIG. 1 in receiving and transmitting messages.

Referring now to FIG. 4, the functional construction and operation of remote modem 10 according to the preferred embodiment of the present invention is now described in detail. As illustrated in FIGS. 1 and 4, remote modem 10 interfaces with user unit 9 over interface 9, and with phone jack PJ by way of analog front end ("AFE") 18; bidirectional communication is thus accomplished by way of interfaces 9, 18, with transmit and receive paths disposed between those interfaces as now described. The functional blocks of FIG. 4 are processes that are preferably carried out by way of programmable hardware, as described in further detail below, or alternatively by way of custom hardware for one or more of the specific functions.

On the transmit side, modem 10 receives digital information from user unit 8 via interface 9, and packets the information in a physical layer frame, which is then modulated to multiple DMT subcarriers, or subchannels, by way of an inverse Fast Fourier Transform ("IFFT") process, for application to twisted pair wire facility TWP via phone jack PJ. Framing and flow control process 11 receives the digital information from interface 9, and buffers the information according to a positive flow control method in which modem 10 receives a reply from modem $20_k$ for a previously sent data packet prior to sending the next data packet. Preferably, framing and flow control process 11 formats each frame of information to include a header field in advance of the data for synchronization, and a circular redundant code ("CRC") field at the end of the frame to permit error detection.

By way of an aside, it is useful to transmit "dummy" or "filler" data, such as a recurring scrambled pseudo-random sequence, over facility TWP when in an idle mode, in order to maintain synchronization between modems 10, $20_k$. This idle mode is particularly prevalent for the transmit side of remote modem 10, considering that most of the data communication between modems 10, $20_k$ is in the downstream direction. In any case, modems 10, $20_k$ must be able to distinguish dummy data from actual data, preferably by way of the header field. These idle periods also may be used to actively check the SNR for various subchannels, in a similar manner as during initialization. Additionally, if certain subchannels are found to be consistently unusable, framing and flow control process 11 can generate "stuffing" words to ensure that the bad subchannels are not used; the receiving modem must be aware of these bad subchannels, so that the stuffing words (which are themselves usually modified by the severe attenuation) are ignored.

According to the DMT approach, digital data is encoded to correspond to a point in an amplitude-phase "constellation." Discussion of the encoding of DMT data may be found in the following documents, Cioffi, "A Multicarrier Primer", *Tutorial submitted to Standards Committee T1 of IEEE* (1991); Chow, et al., "A Discrete Multitone Transceiver System for HDSL Applications", *Journal on Selected Areas in Communications*, Vol. 9, No. 6 (IEEE, Aug. 1991), pp. 895–908; and Bingham, "Multicarrier Modulation for Data Transmission: An Idea Whose Time Has Come", *IEEE Communications Magazine* (May, 1990), pp. 5–14, all incorporated herein by this reference. As is known in this art, DMT associates each possible digital value (depending upon the bit loading for the particular subchannel or subcarrier) with an amplitude and phase combination. For example, if a subcarrier has been assigned to a bit loading of four, the constellation for that subcarrier includes sixteen (i.e., $2^4=16$) possible amplitude-phase combinations, each associated with one of the sixteen possible digital values; if a subcarrier has been assigned to a bit loading of eight (which is the maximum according to the MDSL approach used in this embodiment of the invention), two-hundred fifty-six amplitude-phase combinations are present in the constellation, each associated with one of the two-hundred fifty-six possible digital values presented by the eight bits. The smaller constellations are preferably a subset of the largest (eight-bit) constellation, for ease of encoding. However, the less-populated constellations will have less power than the more heavily populated subchannels, and as such gain scaling of the subchannels is preferred to amplify the less-populated subchannels. Furthermore, it is preferred to encode subcarriers as a group, for efficiency of operation where modem 10 is implemented by way of a pipelined digital signal processor ("DSP"); this grouping combines multiple sub-carriers into 16-bit word units, such that each sub-carrier is confined within a word boundary. Some subcarriers will have their bit loading reduced by one or more bits as necessary to maintain this grouping. It is also preferred to pre-group subcarriers as part of the initialization process to generate a pre-stored macro of the subcarrier grouping, eliminating the need for conditional call and conditional branch operations in the DSP code.

In the flow of FIG. 4, the ordering of the received data according to subchannel and its unpacking is performed in process 12, while the mapping of the data into the constellation points within each subcarrier is performed as part of bit mapping and gain scaling process 13, preferably through use of a look-up table. Scaling of the amplitudes of the various subchannels is also carried out in process 13. The grouping and encoding of processes 12, 13 effectively convert each of the data words into the frequency domain, as the output of process 13 is a sequence of amplitude and phase values (encoded by the constellations), with the order in the sequence corresponding to the frequency of the associated subchannels.

Clipping control process 14 and IFFT process 15 are then next performed to generate time-domain signals corresponding to the encoded subcarriers. IFFT process 15 in modem 10 thus generates thirty-two tones (for the relatively low frequency upstream signals) for this communication, preferably by a sixty-four tone IFFT in which the upper thirty-two tones are set to zero, providing better frequency cut-off. Clipping control process 14 is done in conjunction with IFFT process 15, that is, by a feedback process in response to the output of IFFT process 15 to determine whether clipping control is required. This may be accomplished by monitoring overflow flags in the status register of the DSP; upon detection of an overflow, process 14 sets certain bits (referred to as operation and maintenance bits ("OAM") bits, indicating that the transmitter is repairing the clipped frame over the next two frames; these two frames will be combined and decoded by the receiving modem $20_k$.

Following IFFT process 15, process 16 adds a circular prefix to interframe portions of the sequence as a guard time, which permits the time-domain equalizer filter of the receiving modem $20_k$ to have the appropriate impulse response, as is now described. In a system such as illustrated in FIG. 1, the received transmission data over twisted pair wire facility TWP may be considered as a time-domain sequence of received data $y_n$, which corresponds to the transmitted data sequence $x_k$ convoluted with the impulse response $h_i$ of the transmission channel as in the following Equation 1:

$$y_n = h_i \otimes x_k \quad \text{Equation 1}$$

If one assumes that transmitted data sequence $x_k$ repeats every frame, the above linear convolution is the same as a circular convolution, in which case the application of a Fast Fourier Transform ("FFT") to each side of the convolution provides a product in the frequency domain as in the following Equations 2 and 3:

$$Y_k = H_k \cdot X_k \quad \text{Equation 2}$$

or $$X_k = \frac{Y_k}{H_k} \quad \text{Equation 3}$$

in which case the transmitted data $H_k$ (and, in the time domain, $x_k$) is readily retrieved from received data $Y_n$ (or $y_n$).

However, in real transmission the data stream does not repeat itself every frame. As such, the frequency-domain product is not satisfied because data in a previous frame "leaks" into the current frame via IFFT process 15, thus creating inter-symbol interference ("ISI"). According to the preferred embodiment of the invention, process 16 adds a circular prefix by prepending the prefix to the data stream prior to transmission. This prefix corresponds to that shown by the following Equation 4:

$$x'_{-k} = x_{N-k} \text{ for } k=1 \text{ to } M \quad \text{Equation 4}$$

and is inserted prior to the first actual datum $x_0$. The size M of the circular prefix is selected to be longer than the channel impulse response, such that the circular convolution assumption may be met (i.e., the prefix is sufficiently long to prevent previous frame data from leaking into the current frame). As a result, the modified data stream appears to partially repeat itself.

The addition of the circular prefix requires that the receiving modem must remove $$y'_{-k} \text{ for } k=1 \text{ to } M$$

from the received data stream prior to FFT processing of the received signal. Because the prefix size M is larger than the channel impulse response, the circular convolution assumption is effectively met, permitting demodulation to be performed in the frequency domain as noted above. Removal of the prefix is accomplished by way of time domain equalization ("TEQ"), as is described below.

In this exemplary embodiment of the present invention, for transmission from remote modem 10 to central office modem $20_k$, the length of the circular prefix is sixteen points out of a sixty-four point IFFT. Process 17 interfaces the frame with analog front end 18, for transmission over twisted pair wire facility TWP via phone jack PJ.

On the receive side of remote modem 10, which receives and processes the high-frequency data communication from central office modem $20_k$ at subcarriers within the downstream bandwidth DOWN of FIG. 3, analog signals are received from twisted pair wire facility TWP via analog front end 18 and AFE interface 30, where AFE interface 30 includes sufficient analog-to-digital conversion capability. According to this embodiment of the invention, where frequency domain multiplexing is used to separate upstream and downstream communications, a sharp analog filter is implemented within analog front end 18, preferably by way of a relatively low cost elliptic analog filter 21. It is contemplated that this elliptic analog filter 21 violates T1.413 group delay requirements in the ADSL standard by introducing an impulse response that is longer than 250 μsec (as opposed to the 50 μsec limit under T1.413). However, the relatively low sampling rate used in this MDSL implementation permits implementation of a longer time domain equalization process to eliminate ISI that may be introduced by the extension of the channel impulse response by low-cost elliptic analog filter 21.

Clock recovery circuitry 19 in remote modem 10 is provided for purposes of synchronization, considering that central office modem $20_k$ provides the master clock in the system of FIG. 1. According to the preferred embodiment of the invention and as detailed later in FIG. 11, clock recovery circuitry 19 includes a numerically controlled oscillator to synchronize the communications received over twisted pair wire facility TWP. Automatic gain control ("AGC") process 23 maintains proper gain control at analog front end 18, in the conventional manner.

Time domain equalizer ("TE Q") process 31 is provided in modem 10 to eliminate the ISI that is present, and particularly that which is introduced by analog filter 21 in analog front end 18 for separating the upstream and downstream traffic over twisted pair wire facility TWP. As described in further detail below, the coefficients of TEQ process 31 are determined during initialization, as these coefficients depend upon the response of twisted pair wire facility TWP.

Figure 5:
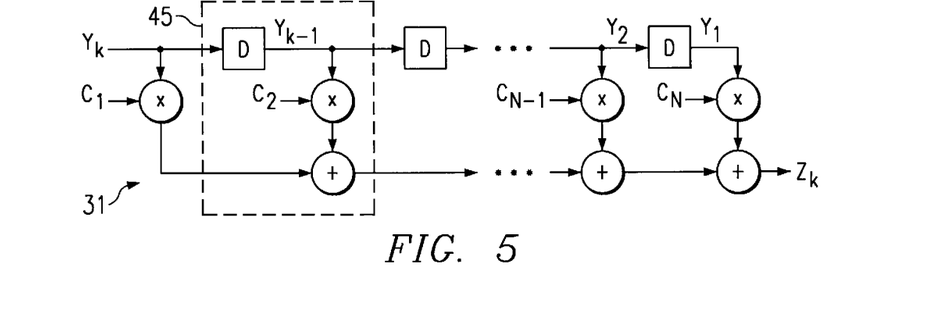
FIG. 5 is a representation of a time-domain equalizer ("TEQ"), realized by way of a finite impulse response ("FIR") digital filter.

TEQ process 31 according to this embodiment of the invention is a conventional finite impulse response ("FIR") filter that is implemented by way of a software routine performed by a digital signal processor ("DSP"). Particularly for the relatively long channel impulse response that is introduced by analog filter 21 in AFE 18, this FIR filter requires a relatively large number of "taps". FIG. 5 illustrates the implementation of an FIR filter in TEQ process 31. In this example, considering the input sequence to TEQ process 31 as $y_k$, one may express the filtered output $z_k$ as in the following Equation 5:

$$z_k = y_k c_1 + y_{k-1} c_2 + \ldots + y_2 c_{N-1} + x_1 c_N \quad \text{Equation 5}$$

where the sequence of coefficients c implement the desired filtering effect. As illustrated in FIG. 5, each tap 45 corresponds to a multiply-and-add operation, including a delay D for the received data value. The size N of TEQ process 31 thus corresponds to the number of taps 45 (plus one).

In this preferred embodiment of the invention, as noted above, because the channel impulse response is relatively long, requiring a relatively long circular prefix, the implementation of TEQ process 31 may require a relatively large number of DSP operations because of the relatively large number of taps 45. As a result, it is desirable to optimize the selection of the TEQ coefficients c during initialization, given that many solutions are permitted since TEQ process 31 does not invert the channel; this optimization preferably achieves the most effective channel impulse length reduction with a minimum number of TEQ taps 45. The selection of these TEQ coefficients c is described in further detail in U.S. patent application Ser. 08/995,256, entitled, "Digital Subscriber Line Modem Initialization," having the same inventor as the present document, filed Dec. 19, 1997, and which is hereby incorporated herein by reference.

Following the ISI filtering of TEQ process 31, modem 10 applies process 32 to the bitstream to remove the circular prefixes. Fast Fourier Transform ("FFT") process 33 performs a 256-point FFT to account for the 128 tones used in the high-frequency downstream transmission received by remote modem 10. Clipping control process 34 restores any words that were separated in transmission due to overflow, as noted above, and the resultant frequency-domain sequence is applied to host processor interface ("HPI") control process 35, if remote modem 10 is realized as multiple processors.

Frequency equalization in the preferred embodiment is accomplished by two separate processes, those including gain equalizer 36 and phase equalizer 37, as detailed below. By way of introduction at this point, gain equalizer 36 flattens the amplitude distortion of the signal spectrum of the received sequence, and phase equalizer 37 compensates for phase distortion. As detailed later, the phase distortion correction may be for either or both of channel effects or oscillator-induced jitter effects. In any event, the equalized signals are applied to slicer 38 which using a bounded decision region performs the hard decoding of the constellation; errors in this process are received by update process 39, which updates the coefficients in phase equalizer 37 as detailed later. Bit demapping and gain scaling process 40, tone reordering and packing process 41, and deframing and flow control process 42, perform the inverse of the transmission sequence of processes 11, 12, 13, resulting in a digital word that is applied user unit 8 via interface 9.

Figure 6:
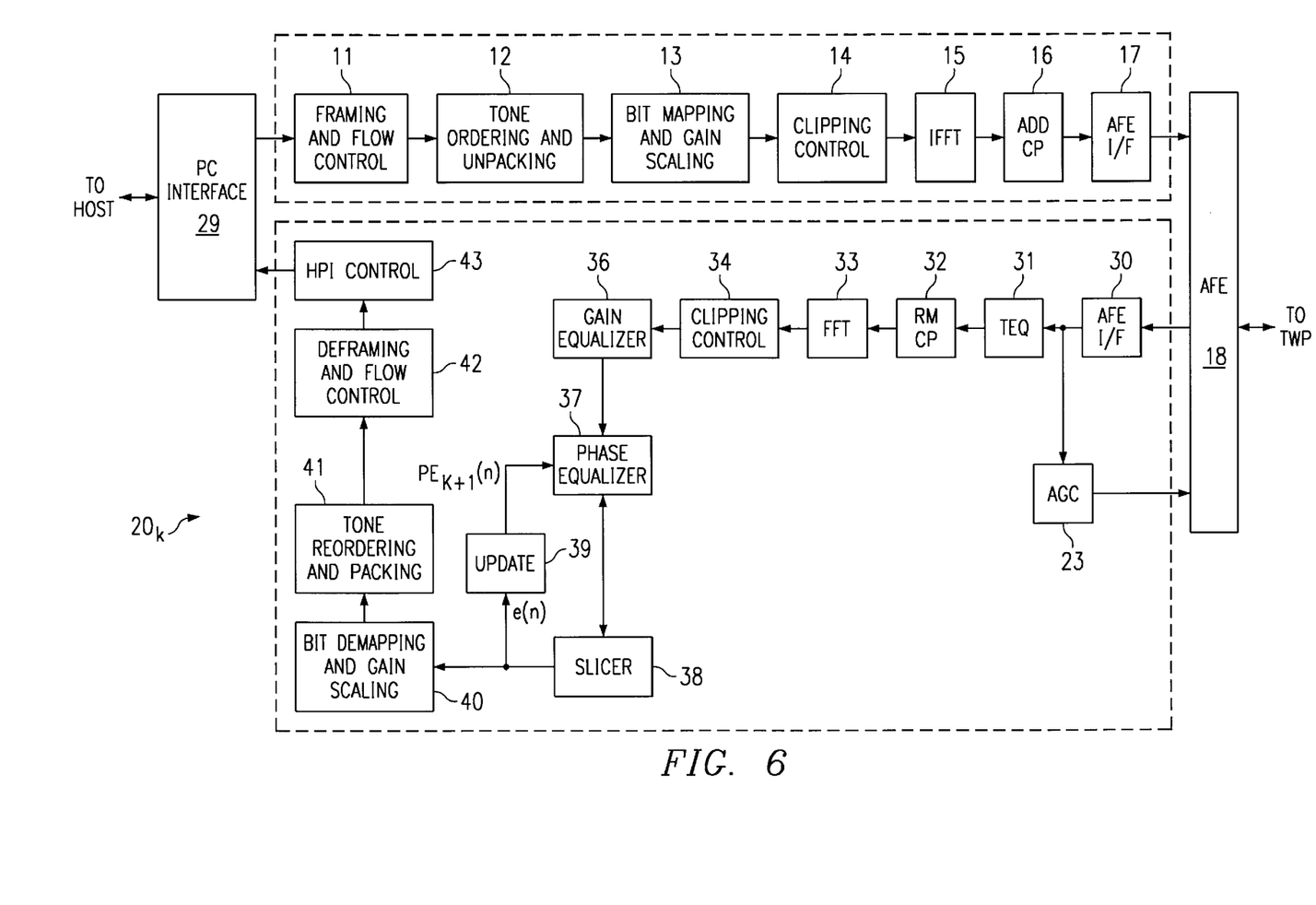
FIG. 6 is a block flow diagram illustrating the operating functions of the central office modem in the system of FIG. 1 in receiving and transmitting messages.

Referring briefly now to FIG. 6, the functional construction and operation of central office modem $20_k$ is now described. Modem $20_k$ includes analog front end ("AFE") 18 which, in this case, is connected to twisted pair wire facility TWP either directly or through a switch. Interface 29 of modem $20_k$ is connected to a host computer (not shown) that is within DSL modem bank 20 or within router 22, dependent upon the architecture of central office CO (FIG. 1).

Similar processes in modem $20_k$ as in remote modem 10 are indicated by the same reference numeral, it of course being understood that the transmission side of central office modem $20_k$ operates at high frequency (corresponding to the downstream bandwidth DOWN of FIG. 2), and that the receiving side of central office modem $20_k$ operates at low frequency (corresponding to the upstream bandwidth UP of FIG. 2). As such, IFFT process 15 performs a 256 point (128 tone) IFFT, while FFT process 33 performs a 64-point (32 tone) FFT on the receive side.

In addition, central office modem $20_k$ varies from remote modem 10 in that the receive side does not include clock recovery circuitry, since central office modem $20_k$ itself generates the master clock signal in this synchronous transmission. Additionally, on the receive side, HPI control process 43 is performed after deframing and flow control process 42, as shown in FIG. 6, if central office modem $20_k$ is realized as multiple processors.

Figure 7:
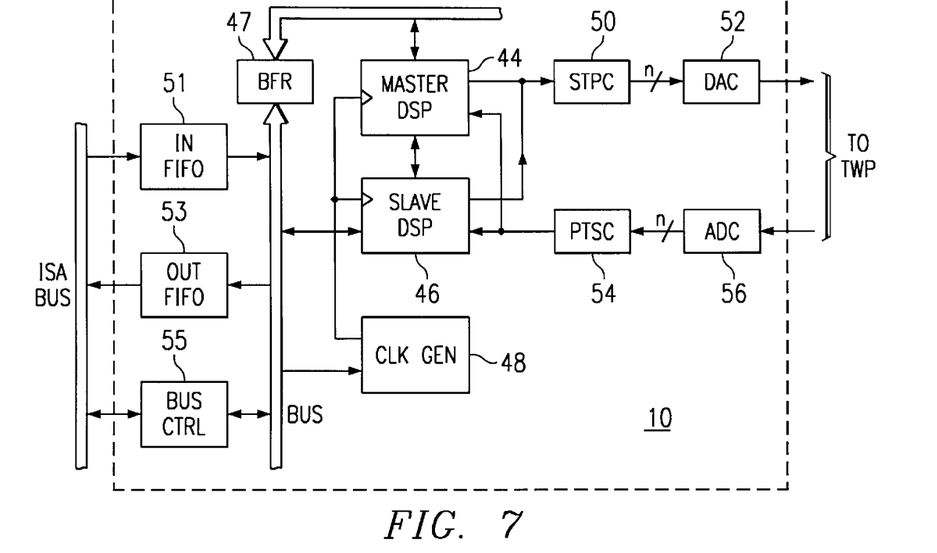
FIG. 7 illustrates a block diagram of a DSL modem card.

FIG. 7 illustrates the general construction of remote modem 10 according to one example of the preferred embodiment of the invention. As illustrated in FIG. 7, modem 10 includes two digital signal processors ("DSPs") 44, 46, arranged in a master/slave fashion, such that slave DSP 46 is available to execute certain operations, such as FFTs and digital filtering, under the control and direction of master DSP 44. This master/slave arrangement is particularly suitable where DSPs 44, 46 are of modest performance;

alternatively, a single high-performance DSP, such as of the TMS320C6x class, is capable of performing all of the DSP functions in remote modem 10. In this example of FIG. 7, master DSP 44 and slave DSP 46 can each transmit signals to twisted pair wire facility TWP via serial-parallel conversion circuit 50, which in turn presents an n-bit digital word to digital-to-analog converter ("DAC") 52 for application to twisted pair wire facility TWP. Conversely, master DSP 44 and slave DSP 46 can each receive signals from twisted pair wire facility TWP via analog-to-digital converter ("ADC") 56 and parallel-serial conversion circuit 54. Modem 10 includes dock generation circuitry 48 for generating the internal clocks within modem 10, including clock recovery as described above.

On the host interface side of modem 10, DSPs 44,46 are connected to bus BUS. Bus BUS is also connected to input and output FIFO memories 51, 53, respectively, through which frame information is communicated to bus ISA BUS, which is the main bus of the host computer (e.g., user unit 8 for modem 10). This communication is controlled by way of bus control circuitry 55, which resides on both of buses ISA BUS and BUS, and which also provides the functionality (or which may be accomplished through separate circuitry to permit various commands to pass between modem 10 and its corresponding host computer.

While the construction of remote modem 10 is illustrated in FIG. 7, it is contemplated that central office modem $20_k$ may be similarly constructed, if desired, considering that the functions performed thereby are quite similar, as described above. It is also contemplated that the frequency equalization methodology according to the preferred embodiment of the invention, as is now described in detail, may readily be executed by modems 10, $20_k$ constructed in the manner illustrated in FIG. 7. However, it is further contemplated that the frequency equalization methodology may be accomplished by alternative DSL modems as well.

Figure 8:
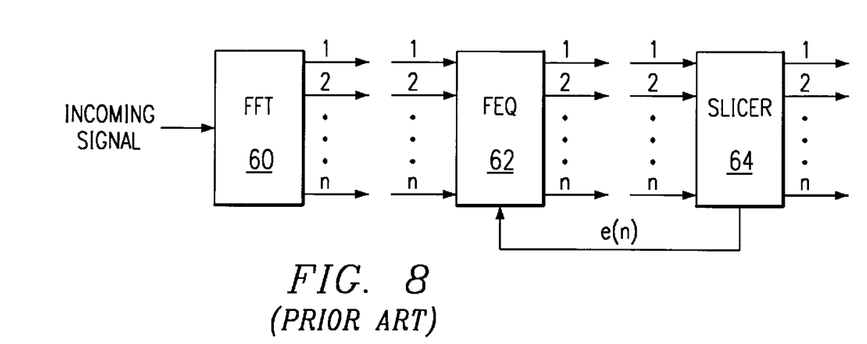
FIG. 8 illustrates a block diagram of a prior art channel equalization system using a combined frequency domain equalizer.

Before proceeding with a detailed discussion of the frequency equalization methodology of the preferred embodiment, FIG. 8 illustrates a block flow diagram illustrating the operating functions of a prior art methodology for frequency equalization of a received signal. Note that FIG. 8 is simplified in that it is understood that various other steps may occur in connection with the received signal, which necessarily include its conversion from analog to digital and some earlier time domain equalization. At some point, therefore, the incoming signal is coupled to a Fast Fourier Transform ("FFT") process 60, thereby outputting a frequency domain signal for each of the n subchannels. The n frequency domain signals are coupled to a frequency domain equalizer ("FEQ") 62 which is required to provide a corrective function, denoted in this document as C(n). Thus, for each of the signals X(n) incoming to FEQ 62, a corresponding output may be derived from the following Equation 6:

$$Y(n)=C(n)*X(n) \quad \text{Equation 6}$$

Lastly, the corrected signals Y(n) are provided to a slicer 64, which, in one sense like slicer 38 in the preferred embodiment performs the hard decoding of the constellation.

An important observation which is later also addressed in connection with the preferred embodiment arises from an additional aspect of the prior art of FIG. 8. Specifically, as a basis for analysis and contrast to the preferred embodiment, attention is now directed to the feedback of an error signal e(n) from slicer 64 to FEQ 62. This error signal represents the difference between the output of slicer 64 and its input, and is provided so that the complete corrective function C(n), once initialized at start up, is updated dynamically using a least mean square ("LMS") methodology. Thus, for a corrective function $C_k(n)$ corresponding to a $k^{th}$ frame of information being processed by FEQ 62, the corrective function for the next frame, designated therefore as $C_{k+1}(n)$ may be determined by LMS. More particularly, first defined in the following Equation 7 is the error signal e(n) from slicer 64 based on its input Y(n) as output by FEQ 62 (from Equation 6), and further in view of the output signal from slicer 64, which is designated $Y_0(n)$:

$$e(n)=Y(n)-Y_0(n) \quad \text{Equation 7}$$

where,
e(n) is the error signal introduced above provided by slicer 64 to FEQ 62, that is, it is the difference between the output of slicer 64 and the input of slicer 64;
Y(n) is the input to slicer 64; and
$Y_0(n)$ is the output from slicer 64.

Given Equation 7, using LMS both a real and imaginary value may then be derived for the corrective function for the next frame, $C_{k+1}(n)$, as shown in the following Equation 8 directed to the real value and Equation 9 directed to the imaginary value:

$$\text{Re}[C_{k+1}(n)] = \text{Re}[C_k(n)] + \mu \frac{\partial |e(n)|^2}{\partial \text{Re}[C(n)]} \quad \text{Equation 8}$$

$$\text{Im}[C_{k+1}(n)] = \text{Im}[C_k(n)] + \mu \frac{\partial |e(n)|^2}{\partial \text{Im}[C(n)]} \quad \text{Equation 9}$$

From the real and imaginary components of Equations 8 and 9, next a gradient search algorithm may be used, under which a result is derived for $C_{k+1}(n)$, as shown in the following Equation 10:

$$C_{k+1}(n)=C_k(n)+\mu*e(n)*X*(n) \quad \text{Equation 10}$$

where,
$\mu$ is a constant which is predetermined from off-line simulation;
e(n) is the error signal introduced above and provided by slicer 64; and
X*(n) is the complex conjugate of X(n).

Importantly for purposes of contrasting with the preferred embodiment described below, note therefore that in the prior art the error signal e(n) is used to correct a combined function, C(n), which affects both gain and phase equalization.

It has been recognized in connection with the present invention, as further appreciated from Equation 10 and additional equations shown below, that the above approach may prove undesirable or unworkable in various embodiments. Specifically, given Equation 10 and its implementation of FIG. 8, the present inventor has considered the effect of the speed at which C(n) converges for each of the n different subchannels, and more importantly this speed for each subchannel relative to that of the other subchannels. Specifically, given Equation 10, this relative convergence speed for a subchannel n may be shown as in Equation 11 as follows:

$$\text{relative convergence speed} = \frac{C_{k+1}(n) - C_k(n)}{C_k(n)} \quad \text{Equation 11}$$

Subtracting $C_k(n)$ from both sides of Equation 10 and substituting the result of the right side of Equation 10 into the numerator of Equation 11 yields the following Equation 12:

$$\text{relative convergence speed} = \frac{\mu * e(n) * X_k^*(n)}{C_k(n)} \qquad \text{Equation 12}$$

Further substituting Equation 6 for the denominator of Equation 12 then provides the following Equation 13:

$$\text{relative convergence speed} = \frac{\mu * e(n) * X_k^*(n) * X_k(n)}{Y_k(n)} \qquad \text{Equation 13}$$

Given Equation 13, note the effect of its factors on convergence speed. First, $\mu$ is constant and, thus, has the same effect on all convergence speeds. Additionally, when equalization is determined dynamically with the decision directed computation, the maximum value of e(n) is bounded by the decision region and is independent of frequency bins; thus, this too has the same effect on all convergence speeds. Lastly, however, note the effect on convergence speed per subchannel from both the value of Y(n) and X(n). With respect to Y(n), recall from Equation 6 that it represents the signal after frequency equalization; thus, its variance is relatively small and its amplitude may be approximated as a constant. However, with respect to X(n), note the following. First, the effect of X(n) is squared (i.e., $|X(n)|^2$). Second, as also appreciated by the present inventor, the value of each X(n) differs dramatically for different values of n. Specifically, the frequency response of an incoming signal along typical twisted copper wire loop differs widely across a frequency band between 0 and 1 MHz, and this is the frequency band contemplated for various DSL modems. Particularly, within this frequency band, an incoming signal at lower frequencies may have an amplitude on the order of 30 dB or more than an incoming signal at higher frequencies. Returning to Equation 13, therefore, the convergence speed of a subchannel at a lower frequency will be greatly different than the convergence speed of a subchannel at a higher frequency. In conclusion, the present inventor has determined that the difference between convergence speeds for the different subchannels must be maintained to some acceptable level. If this difference (or "step size") is too large, then instability in the LMS algorithm may arise such that proper equalization is not achieved and, thus, incoming data is not properly decoded. If this step size is too small, then some data at one end of the frequency spectrum may be accurately decoded while data toward the other end of the frequency spectrum is lost. Thus, below the preferred embodiment is described where there is an implementation to coordinate the step size of the convergence speed of each subchannel so that each such convergence speed approximates the convergence speed of each of the other subchannels.

Having explained the detriments of the prior art frequency equalization approach of FIG. 8, reference is now returned to FIG. 4 and, more particularly, to gain equalizer 36 and phase equalizer 37 of that Figure. Recall at the outset that in connection with the earlier discussion of FIG. 4, these equalizers were introduced by noting that gain equalizer 36 flattens the signal spectrum of the received sequence by converting the amplitude of each of the subchannels to an approximately equal value, and phase equalizer 37 compensates for phase distortion. Having now presented a prior art approach, a greater appreciation of these FIG. 4 aspects may be explored. Specifically, the combined effect of gain equalizer 36 and phase equalizer 37 may now be represented as a combined frequency equalization function denoted in this document as CEQ(n). Thus, for each of the signals X(n) incoming to gain equalizer 36, a corresponding output from phase equalizer 37 may be derived from the following Equation 14:

$$Y(n) = CEQ(n)*X(n) \qquad \text{Equation 14}$$

Expanding Equation 14, let GE(n) be the corrective function provided by gain equalizer 36 and PE(n) be the corrective function provided by phase equalizer 37, then the following Equation 15 results:

$$Y(n) = GE(n)*PE(n)*X(n) \qquad \text{Equation 15}$$

Given Equation 15, reference is first turned in more detail to gain equalizer 36. Specifically, the function GE(n) provided by gain equalizer 36 is to roughly compensate for channel frequency "roll-off." Roll off is the condition which, as known in the art, represents the gradual decay of the received signal over time. In this regard, the function of gain equalizer 36 makes each tone (i.e., the signal represented at the subcarrier) have approximately the same amplitude when it is output from gain equalizer 36, and thus before it is processed by phase equalizer 37. In the preferred embodiment, the value of GE(n) is established during a training process for each modem, as detailed later as are other training procedures. At this point, however, it may be noted that once GE(n) is established by the training procedure, it is thereafter kept constant. In other words, it is not affected by feedback (in contrast to the e(n) feedback of the prior art shown in FIG. 8).

Also given Equation 15, reference is now turned in more detail to phase equalizer 37. Here, note that the value of PE(n) is dynamically updated by the modem in response to a feedback error signal, and preferably for each incoming frame. Initially, PE(n) is set to one, particularly since phase equalizer 37 is primarily compensating only for phase correction, with amplitude correction having been achieved via gain equalizer 36. Thereafter, as slicer 38 performs the hard decoding of the constellation, it also provides the result Y(n) and a corresponding error signal e(n) to update process 39. In response, update process 39 updates the value of PE using an LMS process which, therefore, is derived from the following Equations 16 through 18 and results in Equation 19:

$$[e(n)]^2 = (Y(n) - Y_T(n))^2 \qquad \text{Equation 16}$$

where, e(n) is the error signal provided by slicer 38 to update process 39;

Y(n) is the received signal from phase equalizer 37; and $Y_T$ is the target signal after correction.

Continuing with the LMS approach, the derivative of e(n) with respect to PE(n) is as follows in Equation 17:

$$\frac{\partial [e(n)]^2}{\partial PE(n)} = 2(Y(n) - Y_T(n))\frac{\partial Y(n)}{\partial PE(n)} \qquad \text{Equation 17}$$

$$= 2e(n)*GE^*(n)*X^*(n)$$

Additionally, under LMS, the next value of PE(n), denoted $PE_{k+1}(n)$ may be stated in view of the present value $PE_k(n)$, as in the following Equation 18:

$$PE_{k+1}(n) = PE_k(n) + \mu \frac{\partial [e(n)]^2}{\partial PE_k(n)} \qquad \text{Equation 18}$$

Next, substituting the result of Equation 17 into Equation 18 leaves the following Equation 19 as the resultant operation of update process 39 to provide the value of $PE_{k+1}(n)$ to phase equalizer 37:

$$PE_{k+1}(n) = PE_k(n) 2\mu^* e(n)^* GE_k^*(n)^* X_k^*(n) \qquad \text{Equation 19}$$

where, $2\mu$ is a constant (twice the value of the off-line determined constant $\mu$ of Equation 18);

GE*(n) is the complex conjugate of GE(n); and

X*(n) is the complex conjugate of X(n).

Given the preceding, it may now be shown how the use of a separate gain equalizer 36 and phase equalizer 37 further results in an improved convergence speed, which is first demonstrated by developing an equation for such speed. Specifically, the relative speed of convergence on PE(n) may be stated as in the following Equation 20:

$$\text{convergence speed} = \frac{PE_{k+1}(n) - PE_k(n)}{PE_k(n)} \qquad \text{Equation 20}$$

Next, subtracting $PE_k(n)$ from both sides of Equation 19 and then substituting the result of the right side of Equation 19 into the numerator of Equation 20 yields the following Equation 21:

$$\text{convergence speed} = \frac{2\mu * e(n) * GE_k^*(n) * X_k^*(n)}{PE_k(n)} \qquad \text{Equation 21}$$

Given Equation 21, recall that initially PE(n) is set to a value of one. Thus, for that time and even for subsequent values it may be assumed that $|PE(n)| \approx 1$. Once again, the absolute step size may be determined from the absolute value of convergence speed, and thus taking this step for Equation 21 and letting $|PE(n)| \approx 1$ yields the following Equation 22:

$$\text{step size} = |\text{convergence speed}| \qquad \text{Equation 22}$$

$$= \frac{2\mu * e(n) * GE_k^* * X_k^*(n)}{1}$$

Additionally, since the absolute value of a complex number is equal to the absolute value of its conjugate, and by substituting the value of $|PE(n)| \approx 1$ into Equation 15, then Equation 22 yields the following Equation 23:

$$\text{step size} = |2\mu^* e(n)^* Y(n)| \qquad \text{Equation 23}$$

Equation 23 assists in concluding with a key benefit of the preferred embodiment. Specifically, each of its three terms, $2\mu$, $|e(n)|$, and $|Y(n)|$, are independent of tone index (i.e., subcarrier). Specifically, $|Y(n)|$ is approximately the same for each tone because it results from the input X(n) after correction by both gain equalizer 36 and phase equalizer 37. Additionally, $|e(n)|$ is approximately the same for each tone because it is bounded by the decision region of slicer 38. Thus, the step size is uniform for each of the n subchannels; in other words, the complete frequency equalization process of gain equalizer 36 and phase equalizer 37 occurs at a uniform period for each of the subchannels, unlike the prior art configuration of FIG. 8. Consequently, the drawbacks noted above for the prior art are eliminated or at least considerably reduced.

Figure 9:
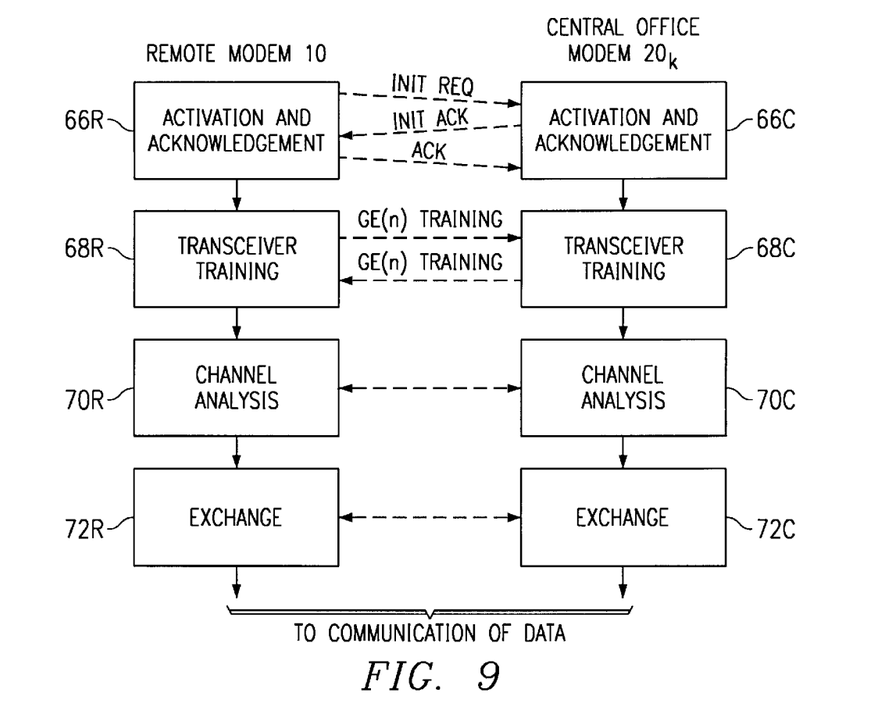
FIG. 9 is a flow chart illustrating the operation of the initialization sequence executed by a remote modem and a central office modem according to the preferred embodiment of the present invention.

Referring now to FIG. 9, the initialization process of modems 10, $20_k$ according to the preferred embodiment of the invention is now described in general, and with a more detailed discussion directed to the establishment of GE(n), the corrective function provided by gain equalizer 36. FIG. 9 illustrates this process by way of parallel flow diagrams, one for each of modems 10, $20_k$. At each stage of the process, modems 10, $20_k$ communicate with one another in accomplishing each step, as described below.

As illustrated in FIG. 9, initialization begins with remote modem 10 executing activation and acknowledgment process 66R, and central office modem $20_k$ executing activation and acknowledgment process 66C. Activation and acknowledgment processes 66, in this embodiment of the invention, are quite similar to the activation and acknowledgment routines performed in conventional ADSL modem systems. Upon power-up, remote modem 10 issues an initialization request over twisted pair wire facility TWP to central office modem $20_k$, for example by issuing a single sinusoid signal at a specific frequency, for example 34.5 kHz. Upon receipt of His initialization request, central office modem $20_k$ issues an acknowledgment signal to remote modem 10 over twisted pair wire facility TWP; this signal may also be a single sinusoid signal at a specific frequency, for example 207 kHz. Remote modem 10, upon receipt of the acknowledgment signal from central office modem $20_k$, next issues a signal indicating both its receipt of the acknowledgment, and also indicating its modem type. As described above, remote modem 10 according to this operation operates according to an MDSL configuration, and instructs central office modem $20_k$ of this mode by issuing another sinusoidal signal at a specific frequency, for example 60.375 kHz, to indicate the MDSL mode.

Each of remote modem 10 and central office modem $20_k$ is then ready to enter transceiver training processes 68R, 68C, respectively. In transceiver training processes 68R, 68C, modems 10, $20_k$ generally alternate in the "training" of their TEQ processes, and the establishment of GE(n). For more information related to training of the TEQ processes, the reader is referred to the above-incorporated U.S. patent application Ser. No. 08/995,256, entitled "Digital Subscriber Line Modem Initialization." Turning then to the training operations relating to the establishment of GE(n), and as shown in FIG. 9, central office modem $20_k$ issues a gain equalization training signal to remote modem 10, while in the opposite direction remote modem 10 issues a gain equalization training signal to central office modem $20_k$. The specific signals are pre-defined since they consist of training signals, and thus each receiving modem has an anticipation of what it will receive and thus what tones X(n) will arrive to its gain equalizer 36. In addition, let S(n) be the set of actual desired amplitudes of the signals to output by gain equalizer 36 in response to the corresponding incoming signal X(n), that is:

$$S(n) = X(n)^* GE(n) \qquad \text{Equation 24}$$

Consequently, the initial value of GE(n) is simply obtained from Equation 24 as shown by the following Equation 25:

$$GE(n) = \frac{S(n)}{X^*(n)} \quad \text{Equation 25}$$

In addition, as stated earlier, in the preferred embodiment this initial value of GE(n) is maintained fixed after this training process. Thus, the error factor e(n) does not thereafter change its value, but instead is directed to correcting only the phase equalization factor PE(n) of phase equalizer 37.

Concluding the context of the discussion of the training process, note further that various other steps may be included before or after training. As examples, before the training there may be the issuance and acknowledgment of a pilot signal between modems 10 and $20_k$ and the determination of a power spectrum density ("PSD") that is to be used in transmission from each modem to the other. As other examples, after the training there may be a synchronization process under which synchronization frames are communicated between modems 10 and $20_k$ to synchronize the polarity of the equalizer processes 36 and 37 in each of modems 10, $20_k$ relative to one another. Each of these various examples is also explored in the above-incorporated U.S. patent application Ser. No. 08/995,256, entitled "Digital Subscriber Line Modem Initialization."

Completing FIG. 9 after the training steps 68R, 68C, remote modem 10 and central office modem $20_k$ begin channel analysis processes 70R, 70C, respectively. Channel analysis processes 70R, 70C each involve modems 10, $20_k$ sending a known sequence of signals to the other, according to which each receiving modem 10, $20_k$ then determines the signal-to-noise ratio ("SNR") for each of the subchannels within the upstream and downstream bandwidth, as the case may be. A detailed description of channel analysis processes 70R, 70C is provided in copending U.S. patent application Ser. No. 60/033,429, filed Dec. 23, 1996, entitled "Bit Loading and Rate Adaptation on DMT MDSL", and incorporated herein by this reference.

In general, processes 70R, 70C are performed by generating a generic bit mapping table for the maximum size constellation, and also a look-up table of gain factors for the gain by which smaller constellation modulation is amplified in order to maintain a constant power spectrum density. These gain factors are to be applied to the symbols prior to transmission. In the channel analysis processes 70R, 70C, modems 10, $20_k$ each measure the variances of noise on each tone, or subcarrier, according to which the SNR may be derived for each subcarrier. Upon determination of the SNR for each subcarrier, or tone, processes 70R, 70C each sort and table the tones in ascending order of gain factor and thus according to bit capacity, and group the tones into blocks, for example into blocks that can convey a sixteen-bit capacity; some tones may require downgrading of their bit capacity in order to fit into a group. Following this grouping, processes 70R, 70C each then generate a bit-loading macro according to which the grouping and transmission of signals may be performed by DSPs 44,46 (FIG. 7) without requiring conditional calls and conditional branches.

In processes 72R, 72C, each of modems 10, $20_k$ communicates the results of their own channel analysis processes 70R, 70C to the other modem $20_k$, 10. Each of modems 10, $20_k$ is then aware of the bit loading determined by the receiving modems, and arranges its transmission parameters accordingly, as described in the above-incorporated copending U.S. patent application Ser. No. 60/033,429. Modems 10, $20_k$ are then ready to perform actual communication of real traffic.

Figure 10:
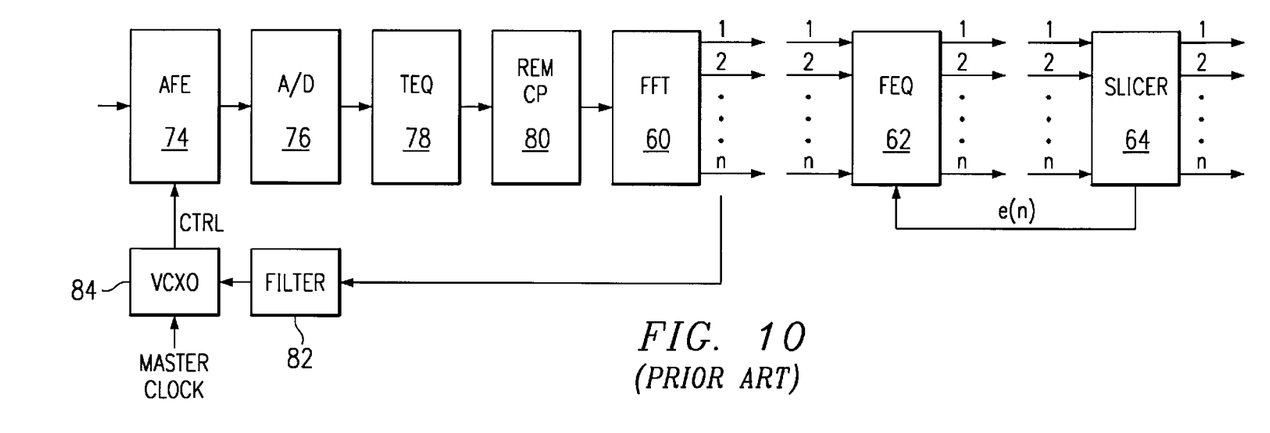
FIG. 10 illustrates the block diagram FIG. 8 and adds thereto additional processes directed to a prior art channel timing recovery system using a voltage controlled crystal oscillator.

Having discussed various operations of modems 10 and $20_k$ under the preferred embodiment, an additional aspect is now contemplated for those modems as relating to timing recovery, where this aspect may be further combined with various of the preceding teachings or, indeed, implemented in some instances in other DSL modem architectures. In any event and before proceeding with a detailed discussion of the timing recover methodology of the preferred embodiment, FIG. 10 illustrates a block flow diagram illustrating the operating functions of a prior art methodology for timing recovery in connection with a received signal. Note that FIG. 10 includes the same prior art illustration as FIG. 8, and further adds additional process blocks. Specifically, preceding FFT process 60 and from left to right in FIG. 10 are an AFE interface 74, an analog-to-digital ("A/D") conversion process 76, a TEQ process 78, and a remove circular prefix process 80. In general, the details of these processes need not be detailed for an appreciation of the tiring recovery aspects described herein, but it may be appreciated that these processes may implement functionality in various manners as known in the art or, indeed, as discussed earlier in connection with processes 30, 31, 32, and 33 of FIG. 4 (or the comparable processes of FIG. 6). Of greater importance to discuss tuning recovery aspects, note that the output of FFT process 60 is not only provided to FEQ 62, but it also provides a feedback signal coupled to the input of a filter 82, which may be implemented as a phase locked loop. The output of filter 82 is connected to the control input of a voltage controlled crystal oscillator ("VCXO") 84, which receives as another input a master clock signal and provides as its output a clock timing signal to AFE interface 74.

The operation of the FIG. 10 processes with respect to timing recovery is as follows. In each received frame, which may be in either or both of training or the communication of real traffic, there is included a pilot signal. The pilot signal provides a known transmission value which may be used for various purposes, where the present discussion focuses on its use for timing recovery. In this respect, as the frame is processed through FFT process 60, if sampling timing has shifted then the pilot tone will rotate away from its normal position and an error will be detectable via the output of FFT process 60. This error signal is processed by filter 82, and then controls VCXO 84. More particularly, this control signal causes VCXO 84 to adjust its output dock timing signal to correct for the error and thereby adjust AFE interface 74 to shift its sample timing for the next frame.

While the preceding implementation of timing recovery may prove satisfactory in some implementations, the present inventor has recognized various of its drawbacks. As an example of its benefits, the use of a VCXO as described above provides fairly precise adjustments in timing signals. However, it is contemplated that DSL technology be implemented in a manner suitable for very wide scale use. Consequently, the cost of each modem is of paramount concern. Given this consideration and as an example of a VCXO drawback, note that VCXO technology may be relatively costly when contrasted to other timing devices. In this regard, below is presented an alternative mechanism which reduces costs, and also may be combined with various of the preceding teachings for yet greater overall efficiency.

Figure 11:
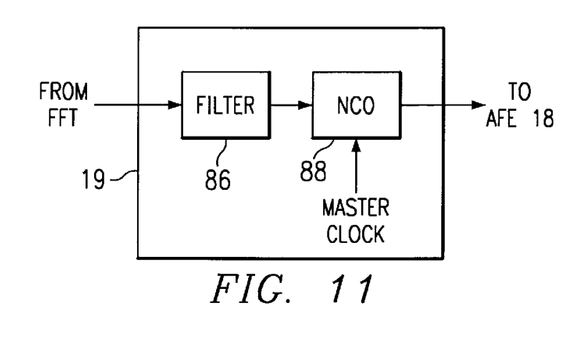
FIG. 11 illustrates a block diagram of various of the components of clock recovery circuitry 19 of FIG. 4.

Turning now to FIG. 11, it illustrates clock recovery circuitry 19 of FIG. 4 in greater detail so as to permit a current discussion of timing recovery aspects not addressed in the earlier discussion of FIG. 4. In addition, while the following discussion is therefore directed to remote modem 10 of FIG. 4, it may likewise be implemented in central office modem $20_k$ of FIG. 6 (although such is not shown in FIG. 6). In either case, if the timing recovery is to be included in a given modem, it is contemplated that the other modem to which it is connected will provide a pilot signal so that the pilot signal may be received and used for such timing recovery. Now, returning briefly to FIG. 4, note that the output of FFT process 33 is also connected to the input of dock recovery circuitry 19. Looking to the added detail of FIG. 11, it may be appreciated that this input is further connected to the input of a filter 86. Filter 86 may be a phase locked loop or other filtering device as ascertainable by one skilled in the art to achieve the functionality provided herein. In any event, the output of filter 86 is connected as an input to a numerically controlled oscillator ("NCO") 88, and which has another input connected to receive a master clock signal. The output of NCO 88 provides a clock timing signal to AFE 18 to control the sampling timing of the interface.

The operation of clock recovery circuitry 19 of FIG. 11 is as follows. In each received frame, again which may be during one or both of training or the communication of real traffic, there is included a pilot signal. In this respect, as the frame is processed through FFT process 33, if sampling timing has shifted then the pilot tone will rotate away from its normal position and an error will be detectable via the output of FFT process 33. This error signal is processed by filter 86, and then controls NCO 88. However, note here that the control of NCO 88 differs from the prior art control of VCXO 84 in that, as known in the art, numerically controlled oscillators only permit integer control inputs rather than continuously variable voltages as is the case for the VCXO. More particularly, an NCO produces an output by dividing their input clock signal by its control input integer, and that integer only may be adjusted by either an single increment or decrement at a time. For example, if $f_0$ is the frequency of the master clock, then the sampling timing clock signal output by NCO 88 is $f_0/K$, where K is some control input integer. However, if it is desired to change the sampling timing clock signal output by NCO 88, then to accomplish that change K may be changed only by either +1 or −1, that is, the sampling timing clock signal may be changed to provide a slower sampling rate of $f_0/K+1$ or a higher sampling rate of $f_0/K-1$. Thus, the resolution of the ability to adjust the sampling rate using an NCO may be considered less than that of a VCXO. Moreover, the present inventor recognizes that this finite resolution of the NCO induces phase jitter into the samples taken from frames received after an adjustment, and this may be particularly non-negligible at high frequency subchannels of the DMT communication. However, the NCO is considerably less expensive to implement in comparison to the VCXO, and again this is particularly noteworthy given the potential for wide scale implementation of DSL technology. Still further and as demonstrated below, in the preferred embodiment the jitter effect arising from the reduced resolution of the NCO may be accounted for by an additional phase adjustment which may be implemented by phase equalizer 37.

From the preceding discussion, at first observation it may appear that the jitter induced by NCO 88 may be prohibitive to properly demodulating samples from received data frames. However, the present inventor has recognized that such jitter is predictable and, thus, its effect can be corrected. Moreover, because phase detector 37 already provides a mechanism for making phase corrections, which in the earlier discussion were directed to correcting phase distortion from channel effects, then the corrective action with respect to jitter also may be achieved by phase detector 37. Alternatively, if phase detector 37 were not in place (e.g., a single FEQ process were used as in the prior art), then a phase detector could be added to accomplish the functionality described below. In any event, it is now presented what corrective factor is preferred to adjust for NCO-induced jitter.

In a DMT system to control the NCO-induced jitter described above it is preferable to adjust the sampling period for only one sample in a DMT frame. In other words, if the nominal sampling period for a frame is T, then for only one sample of the many samples taken in that frame the value of K is changed resulting in a change in the sampling period of T+τ as measured from the immediately preceding sample; thus, τ represents the shift in the time domain for the one sample taken at a period other than T. For each sample thereafter it will be separated from the preceding sample once again by T, but will be shifted by τ due to the change in K for the earlier single sample. In this case, at the DMT receiver for the frame i the sampled signal is as represented in the following Equation 26:

$$f_i=(nT+\tau) \qquad \text{Equation 26}$$

where, n is the number of N samples for the frame i;

T is the nominal sampling period; and

τ is the shift in the time domain for the one sample for which K of NCO 88 was adjusted.

Next, therefore, the demodulated data for the frequency subchannel j may be represented as shown in Equation 27:

$$\tilde{F}[k] = \sum_{n=0}^{N-1} f_i(nT+\tau)\exp\left(j2\pi\frac{kn}{N}\right) = e^{-j2\pi k\frac{\tau}{NT}} * F[k] \qquad \text{Equation 27}$$

From the result of Equation 27 it may be concluded that the term $$e^{-j2\pi\frac{k\tau}{NT}}$$

is the phase jitter due to NCO 88 for the frame at issue; in other words, , for the block of information provided by the frame the term $$e^{-j2\pi\frac{k\tau}{NT}}$$

represents the amount by which the sampled subchannel rotates due to the change in K. Consequently, having identified this jitter, it can be corrected by using phase detector 37 to impose a complementary reverse rotation factor, namely, $$e^{-j2\pi\frac{k\tau}{NT}}.$$

Thus, this additional factor may be included in the function $PE_k(n)$ described earlier, that is, it may be added as an additional multiplier in the product of Equation 19.

From the above, it may be appreciated that the above embodiments provide a DSL modem system which includes improvements over the prior art. For example, the modems of the described system benefit in that they contemplate separate gain and phase equalization for filtering the different subchannels of an incoming data signal. As another example, a corrective error factor is preferably used to correct only the phase equalization process, leaving the gain equalization process constant after training and prior to the next training or training-like operation. As a result, the difference between convergence speeds for the different subchannels is maintained at an acceptable level. As still another example, another aspect includes an NCO for timing correction and reduces implementation cost, while further accommodating any jitter imposed by the NCO by either a separate or combined phase equalization step. As still another benefit, the modem system is preferably implemented in the MDSL context described above, but may well apply to other DSL systems. Sill further, as yet another benefit, while the present embodiments have been described in detail, various substitutions, modifications or alterations could be made to the descriptions set forth above, with such changes not affecting the inventive scope as defined by the following claims.

What is claimed is:

1. A method of modem communication between first and second modems over a communications facility, comprising the steps of:
    operating the first modem to issue communications to the second modem over the communications facility, wherein the communications comprise a plurality of subchannel signals; and
    operating the second modem to perform the steps of:
        converting the communications from time domain communications to frequency domain communications, wherein the frequency domain communications signals comprise a plurality of subchannel signals, and wherein each of the plurality of subchannel signals comprises an amplitude portion and a phase portion;
        equalizing the amplitude portion of each of the plurality of subchannel signals using fixed gain factors corresponding to each of the plurality of subchannel signals; and
        equalizing the phase portion of each of the plurality of subchannel signals using adjustable phase factors corresponding to each of the plurality of subchannel signals, wherein the adjustable phase factors are adjusted in response to previous communications from the first modem to the second modem.

2. The method of claim 1 wherein the step of equalizing the amplitude portion of each of the plurality of subchannel signals comprises equalizing the amplitude of each of the plurality of subchannel signals to an approximately equal value.

3. The method of claim 1 and further comprising, prior to the operating steps, the steps of:
    operating the second modem to issue an initialization request to the first modem over the communications facility; and
    operating the first modem to issue a gain equalization training communications to the second modem in response to the initialization request, wherein the training communications comprise a plurality of subchannel training signals.

4. The method of claim 3 and further comprising the steps of operating the second modem to set the fixed gain factors in response to a relationship between the plurality of subchannel training signals and a corresponding set of desired output signals.

5. The method of claim 1 and further comprising the steps of:
    operating the first modem to communicate the previous communications to the second modem over the communications facility, wherein the previous communications comprise a plurality of subchannel signals; and
    operating the second modem to perform the steps of:
        converting the previous communications from time domain communications to frequency domain communications, wherein the frequency domain communications from the previous communications comprise a plurality of subchannel signals, and wherein each of the plurality of subchannel signals from the previous communications comprises an amplitude portion and a phase portion;
        equalizing the amplitude portion of each of the plurality of subchannel signals from the previous communications using the fixed gain factors;
        equalizing the phase portion of each of the plurality of subchannel signals from the previous communications using the adjustable phase factors to form a corresponding plurality of equalized subchannel signals; and
        adjusting the adjustable phase factors in response to a relationship between a target plurality of subchannel signals and the plurality of equalized subchannel signals.

6. The method of claim 5 wherein the step of adjusting the adjustable phase factors in response to a relationship between a target plurality of subchannel signals and the plurality of equalized subchannel signals comprises adjusting the adjustable phase factors in response to a least mean square relationship between each of the target plurality of subchannel signals and a corresponding one of the plurality of equalized subchannel signals.

7. The method of claim 1:
    and further comprising the step of operating the second modem to issue communications to the first modem over the communications facility;
    wherein the communications from the first modem to the second modem comprise downstream communications over a first bandwidth;
    wherein the communications from the second modem to the first modem comprise upstream communications over a second bandwidth; and
    wherein the first bandwidth includes frequencies that are higher than frequencies in the second bandwidth.

8. The method of claim 1:
    and further comprising the step of operating the second modem to adjust an oscillator for adjusting a rate of sampling the communications;
    wherein the step of operating the second modem to adjust the oscillator introduces a jitter phase shift into the subchannel signals; and
    wherein the step of equalizing the phase portion of each of the plurality of subchannel signals comprises using the adjustable phase factors corresponding to each of the plurality of subchannel signals, wherein the adjustable phase factors are adjusted in response to a corrective phase shift complementary to the jitter phase shift.

9. The method of claim 8 wherein the oscillator comprises a numerically controlled oscillator.

10. The method of claim 1 wherein the communications facility comprises a twisted pair wire facility.

11. The method of claim 1 wherein the first and second modems each comprise DSL modems.

12. A method of modem communication between first and second modems over a communications facility, comprising the steps of:
    operating the first modem to perform the steps of:
        communicating a first set of communications to the second modem over the communications facility, wherein the first set of communications comprise a plurality of subchannel signals; and issuing a second set of communications to the second modem over the communications facility, wherein the second set of communications comprise a plurality of subchannel signals; and operating the second modem to perform the steps of:

converting the first set of communications from time domain communications to frequency domain communications, wherein the frequency domain communications from the first set of communications comprise a plurality of subchannel signals, and wherein each of the plurality of subchannel signals from the first set of communications comprises an amplitude portion and a phase portion;

equalizing the amplitude portion of each of the plurality of subchannel signals from the first set of communications using the fixed gain factors;

equalizing the phase portion of each of the plurality of subchannel signals from the first set of communications using the adjustable phase factors to form a corresponding plurality of equalized subchannel signals;

adjusting the adjustable phase factors in response to a relationship between a target plurality of subchannel signals and the plurality of equalized subchannel signals from the first set of communications;

converting the second set of communications from time domain communications to frequency domain communications, wherein the frequency domain communications signals from the second set of communications comprise a plurality of subchannel signals, and wherein each of the plurality of subchannel signals from the second set of communications comprises an amplitude portion and a phase portion;

equalizing the amplitude portion of each of the plurality of subchannel signals from the second set of communications to an approximately equal value using fixed gain factors corresponding to each of the plurality of subchannel signals from the second set of communications; and equalizing the phase portion of each of the plurality of subchannel signals from the second set of communications using adjustable phase factors corresponding to each of the plurality of subchannel signals from the second set of communications, wherein the adjustable phase factors are adjusted in response to the first set of communications from the first modem to the second modem.

13. The method of claim 12 wherein the step of adjusting the adjustable phase factors in response to a relationship between a target plurality of subchannel signals from the first set of communications and the plurality of equalized subchannel signals comprises adjusting the adjustable phase factors from the first set of communications in response to a least mean square relationship between each of the target plurality of subchannel signals and a corresponding one of the plurality of equalized subchannel signals.

14. The method of claim 12:

and further comprising the step of operating the second modem to adjust an oscillator for adjusting a rate of sampling the communications;

wherein the step of operating the second modem to adjust the oscillator introduces a jitter phase shift into the subchannel signals; and wherein the step of equalizing the phase portion of each of the plurality of subchannel signals comprises using the adjustable phase factors corresponding to each of the plurality of subchannel signals, wherein the adjustable phase factors are adjusted in response to a corrective phase shift complementary to the jitter phase shift.

15. The method of claim 14 wherein the oscillator comprises a numerically controlled oscillator.

16. A method of modem communication between first and second modems over a communications facility, comprising the steps of:

operating the first modem to issue communications to the second modem over the communications facility, wherein the communications comprise a plurality of subchannel signals; and operating the second modem to perform the steps of:

adjusting an oscillator for adjusting a rate of sampling the communications;

converting the communications from time domain communications to frequency domain communications, wherein the frequency domain communications signals comprise a plurality of subchannel signals, and wherein each of the plurality of subchannel signals comprises an amplitude portion and a phase portion;

equalizing the amplitude portion of each of the plurality of subchannel signals;

equalizing the phase portion of each of the plurality of subchannel signals using adjustable phase factors corresponding to each of the plurality of subchannel signals;

wherein the step of operating the second modem to adjust the oscillator introduces a jitter phase shift into the subchannel signals; and wherein the adjustable phase factors are adjusted in response to a corrective phase shift complementary to the jitter phase shift.

17. The method of claim 16 wherein the oscillator comprises a numerically controlled oscillator.

18. A first modem comprising:

an interface for coupling to a communications facility, the communications facility coupled to communicate with a second modem; and processing circuitry responsive to communications received over the communications facility from the second modem, wherein the communications comprise a plurality of subchannel signals, and for performing the steps of:

converting the communications from time domain communications to frequency domain communications, wherein the frequency domain communications signals comprise a plurality of subchannel signals, and wherein each of the plurality of subchannel signals comprises an amplitude portion and a phase portion;

equalizing the amplitude portion of each of the plurality of subchannel signals using fixed gain factors corresponding to each of the plurality of subchannel signals; and equalizing the phase portion of each of the plurality of subchannel signals using adjustable phase factors corresponding to each of the plurality of subchannel signals, wherein the adjustable phase factors are adjusted in response to previous communications from the second modem to the first modem.

19. The first modem of claim 18 wherein the step of equalizing the amplitude portion of each of the plurality of subchannel signals comprises equalizing the amplitude of each of the plurality of subchannel signals to an approximately equal value.

20. The first modem of claim 18:

wherein the processing circuitry is for providing, prior to the converting and equalizing steps, the further steps of:
- communicating an initialization request to the second modem over the communications facility;
- receiving a gain equalization training communications from the second modem in response to the initialization request, wherein the training communications comprise a plurality of subchannel training signals; and
- setting the fixed gain factors in response to a relationship between the plurality of subchannel training signals and a corresponding set of desired output signals.

21. The first modem of claim 18:

wherein the previous communications comprise a plurality of subchannel signals; and wherein the processing circuitry is further for the steps of:
- converting the previous communications from time domain communications to frequency domain communications, wherein the frequency domain communications from the previous communications comprise a plurality of subchannel signals, and wherein each of the plurality of subchannel signals from the previous communications comprises an amplitude portion and a phase portion;
- equalizing the amplitude portion of each of the plurality of subchannel signals from the previous communications using the fixed gain factors;
- equalizing the phase portion of each of the plurality of subchannel signals from the previous communications using the adjustable phase factors to form a corresponding plurality of equalized subchannel signals; and
- adjusting the adjustable phase factors in response to a relationship between a target plurality of subchannel signals and the plurality of equalized subchannel signals.

22. The first modem of claim 21 wherein the step of adjusting the adjustable phase factors in response to a relationship between a target plurality of subchannel signals and the plurality of equalized subchannel signals comprises adjusting the adjustable phase factors in response to a least mean square relationship between each of the target plurality of subchannel signals and a corresponding one of the plurality of equalized subchannel signals.

23. A first modem comprising:
- an interface for coupling to a communications facility, the communications facility coupled to receive communications from a second modem;
- an oscillator coupled to the interface and for establishing a rate of sampling the communications; and
- processing circuitry responsive to the communications, wherein the communications comprise a plurality of subchannel signals, and for performing the steps of:
  - adjusting the oscillator for adjusting the rate of sampling the communications;
  - converting the communications from time domain communications to frequency domain communications, wherein the frequency domain communications signals comprise a plurality of subchannel signals, and wherein each of the plurality of subchannel signals comprises an amplitude portion and a phase portion;
  - equalizing the amplitude portion of each of the plurality of subchannel signals;
  - equalizing the phase portion of each of the plurality of subchannel signals using adjustable phase factors corresponding to each of the plurality of subchannel signal;
  - wherein the step of adjusting the oscillator introduces a jitter phase shift into the subchannel signals; and
  - wherein the adjustable phase factors are adjusted in response to a corrective phase shift complementary to the jitter phase shift.

24. The first modem of claim 23 wherein the oscillator comprises a numerically controlled oscillator.

* * * * *